(12) United States Patent
Pathak et al.

(10) Patent No.: US 12,518,094 B2
(45) Date of Patent: Jan. 6, 2026

(54) AUTOMATED ARTIFICIAL INTELLIGENCE DRIVEN READABILITY SCORING TECHNIQUES

(71) Applicant: Microsoft Technology Licensing, LLC, Redmond, WA (US)

(72) Inventors: Sayan Dev Pathak, Kirkland, WA (US); Christopher Hakan Basoglu, Everett, WA (US); Amit Agarwal, Redmond, WA (US); Shuangyu Chang, Davis, CA (US); Amy Shah, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/346,939

(22) Filed: Jul. 5, 2023

(65) Prior Publication Data

US 2023/0409829 A1 Dec. 21, 2023

Related U.S. Application Data

(63) Continuation of application No. 17/747,585, filed on May 18, 2022, now Pat. No. 11,741,302.

(51) Int. Cl.
*G06F 40/253* (2020.01)
*G06F 40/166* (2020.01)
*G06F 40/205* (2020.01)

(52) U.S. Cl.
CPC .......... *G06F 40/253* (2020.01); *G06F 40/166* (2020.01); *G06F 40/205* (2020.01)

(58) Field of Classification Search
CPC ............................ G06F 40/253; G06F 40/205
See application file for complete search history.

(56) References Cited

U.S. PATENT DOCUMENTS

| | | | |
|---|---|---|---|
| 10,783,549 B2 * | 9/2020 | Sinha | G06Q 30/0242 |
| 2017/0193092 A1 * | 7/2017 | Byron | G06F 40/40 |
| 2018/0143986 A1 * | 5/2018 | Sinha | G06Q 30/0242 |
| 2019/0108215 A1 * | 4/2019 | Jaroch | G06F 40/253 |
| 2020/0090059 A1 * | 3/2020 | Kim | G06Q 50/18 |
| 2020/0175974 A1 * | 6/2020 | Trim | G10L 13/00 |
| 2023/0133843 A1 * | 5/2023 | Maurya | G06F 18/2433 704/9 |
| 2023/0377749 A1 * | 11/2023 | Berisha | G10L 25/66 |

* cited by examiner

*Primary Examiner* — Asher D Kells
(74) *Attorney, Agent, or Firm* — NovoTechIP International PLLC

(57) ABSTRACT

A data processing system implements obtaining a first textual content, segmenting the first textual content into a plurality of first segments, and providing each segment of the plurality of first segments to a first natural language processing (NLP) model to obtain a set of first readability scores for the plurality of first segments. The first NLP model is configured to analyze a textual input and to output a readability score representing a measurement of readability of the textual input. The system further implements aggregating the set of first segment readability scores to determine a first readability score for the first textual content, and perform at least one of causing the first readability score to be presented to a user or performing one or more actions on the first textual content based on the readability score.

10 Claims, 12 Drawing Sheets

Sample 1 ⟋325

Philadelphia Philadelphia brand cream cheese created from milk and Cream was sold under the Phoenix Cheese Company until it merged with Kraft Foods in 1928. Kraft Heinz strategy. The Kraft Heinz Company was focusing on core business practices including SZB 0 based budgeting, revenue management and MBO management by objectives."

Readability score: 0.77⟋330

Sample 2 ⟋335

Philadelphia, Philadelphia brand cream cheese created from milk and Cream was sold under the Phoenix Cheese Company until it merged with Kraft Foods. In 1928 Kraft Heinz strategy. The Kraft Heinz Company was focusing on core business practices including SZB 0 based budgeting, revenue management and MBO management. By objectives ...

Readability score: 0.71⟋340

Sample 3 ⟋345

Philadelphia Philadelphia brand cream cheese, created from milk and cream, was sold under the Phoenix Cheese Company until it merged with Kraft Foods in 1928. Kraft Heinz Strategy The Kraft Heinz Company was focusing on core business practices, including ZBB zero-based budgeting, revenue management, and MBO management by objectives.

Readability score: 0.83⟋350

Voice-to-Text Transcription before Disfluency Removal:

But um but I I I can I can take a look at like the that that the final view from — 305
from leads to CCID.

Readability score: 0.67 — 310

Voice-to-Text Transcription after Disfluency Removal:

But I can take a look at like that the final view from leads to CCID. — 315

Readability score: 0.85 — 320

FIG. 3A

Sample 1

Philadelphia Philadelphia brand cream cheese created from milk and Cream was sold under the Phoenix Cheese Company until it merged with Kraft Foods in 1928. Kraft Heinz strategy. The Kraft Heinz Company was focusing on core business practices including SZB 0 based budgeting, revenue management and MBO management by objectives."

Readability score: 0.77

Sample 2

Philadelphia, Philadelphia brand cream cheese created from milk and Cream was sold under the Phoenix Cheese Company until it merged with Kraft Foods. In 1928 Kraft Heinz strategy. The Kraft Heinz Company was focusing on core business practices including SZB 0 based budgeting, revenue management and MBO management. By objectives ...

Readability score: 0.71

Sample 3

Philadelphia Philadelphia brand cream cheese, created from milk and cream, was sold under the Phoenix Cheese Company until it merged with Kraft Foods in 1928. Kraft Heinz Strategy The Kraft Heinz Company was focusing on core business practices, including ZBB zero-based budgeting, revenue management, and MBO management by objectives.

Readability score: 0.83

FIG. 3B

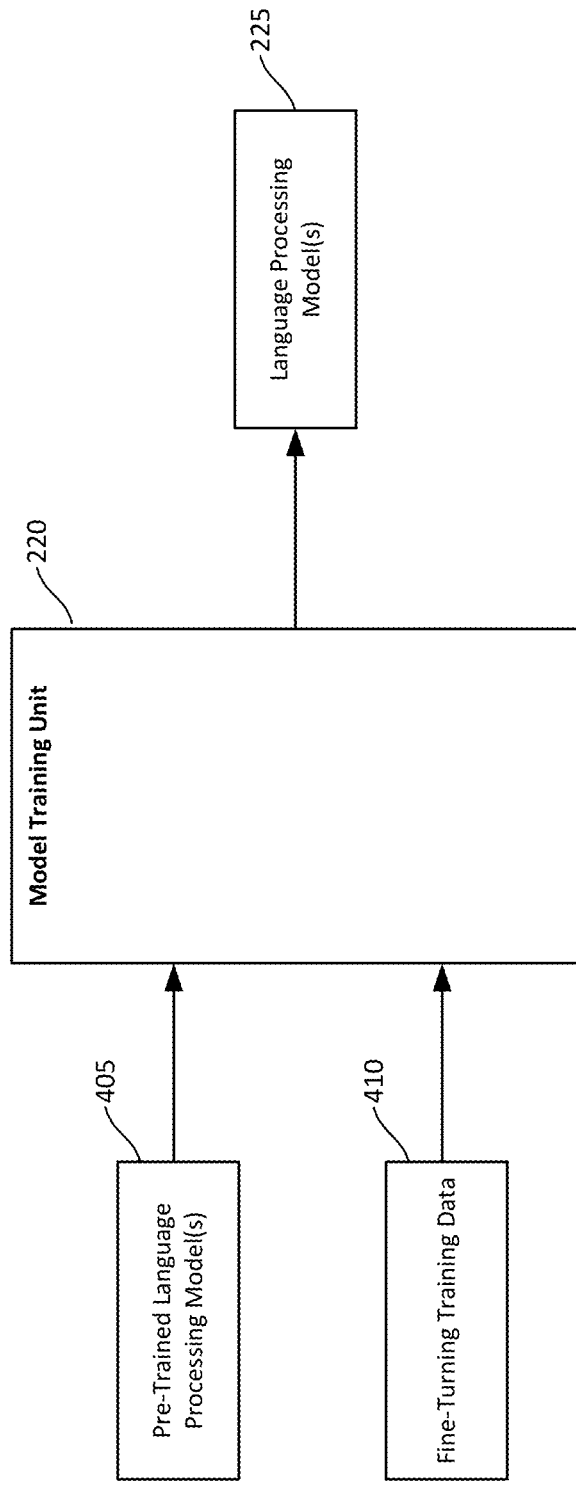

AUTOMATED ARTIFICIAL INTELLIGENCE DRIVEN READABILITY SCORING TECHNIQUES

CROSS-REFERENCE TO RELATED APPLICATION

This application claims the benefit of priority from pending U.S. patent application Ser. No. 17/747,585, filed on May 18, 2022, and entitled "AUTOMATED ARTIFICIAL INTELLIGENCE DRIVEN READABILITY SCORING TECHNIQUES." The entire contents of the above-referenced application is incorporated herein by reference.

BACKGROUND

Natural language generation, also referred to as text generation, has become an important area of research in natural language processing (NLP). Natural language generation aims to produce plausible and readable text in human language from a variety of forms of source content. This source content may include, but is not limited to, unstructured textual content, imagery, structured textual content (such as a table or knowledge base), audio content, and/or video content.

Word error rate (WER) is a commonly used metric for measuring the performance of NLP models. The WER may be calculated by aligning a recognized word sequence output of an NLP model with a reference word sequence and computing the WER based on the number of substitutions, the number of deletions, the number of insertions, the number of correct words, and the number of words in the reference word sequence. However, the usefulness of the WER for assessing the performance of NLP models is not necessarily sufficient. For example, the WER does not account for how disruptive a particular error is to the readability of the predictions made by the NLP model. Thus, the WER and other similar metrics do not provide an effective measurement of the readability of the textual output of an NLP model.

There is also a lack of efficient and cost-effective means for determining the readability of human-generated textual content. Human users of computing devices generate numerous types of textual content that may include various errors that negatively impact the readability of the textual content. However, current techniques for assessing the readability of such textual content are typically manual process in which experts review the textual content for readability. However, this approach is too slow and would significantly interrupt the workflow of the user. Furthermore, engaging such experts would not be cost effective.

Hence, there is a need for improved systems and methods that provide a technical solution for assessing the performance of natural language processing models.

SUMMARY

An example data processing system according to the disclosure may include a processor and a machine-readable medium storing executable instructions. The instructions when executed cause the processor to perform operations including obtaining a first textual content; segmenting the first textual content into a plurality of first segments; providing each segment of the plurality of first segments to a first natural language processing (NLP) model to obtain a set of first segment readability scores for the plurality of first segments, the first NLP model configured to analyze a textual input and to output a readability score representing a measurement of readability of the textual input; aggregating the set of first segment readability scores to determine a first readability score for the first textual content; and perform at least one of causing the first readability score to be presented to a user or performing one or more actions on the first textual content based on the readability score.

An example method implemented in a data processing system for providing content recommendations based on a multilingual natural language processing model includes obtaining a first textual content; segmenting the first textual content into a plurality of first segments; providing each segment of the plurality of first segments to a first natural language processing (NLP) model to obtain a set of first segment readability scores for the plurality of first segments, the first NLP model configured to analyze a textual input and to output a readability score representing a measurement of readability of the textual input; aggregating the set of first segment readability scores to determine a first readability score for the first textual content; and perform at least one of causing the first readability score to be presented to a user or performing one or more actions on the first textual content based on the readability score.

An example machine-readable medium on which are stored instructions according to the disclosure includes instructions, which when executed, cause a processor of a programmable device to perform operations of obtaining a first textual content; segmenting the first textual content into a plurality of first segments; providing each segment of the plurality of first segments to a first natural language processing (NLP) model to obtain a set of first segment readability scores for the plurality of first segments, the first NLP model configured to analyze a textual input and to output a readability score representing a measurement of readability of the textual input; aggregating the set of first segment readability scores to determine a first readability score for the first textual content; and perform at least one of causing the first readability score to be presented to a user or performing one or more actions on the first textual content based on the readability score.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3A is a diagram that illustrates an example transcript of human speech generated using a voice-to-text model of the language analysis service.

FIG. 3B is a diagram that illustrates an example transcript of human speech generated by the language analysis service 110 using a three different voice-to-text NLP models.

FIG. 4 is a diagram of an example model training unit of the language analysis service and the inputs that may be used by the model training unit to generate a language processing model.

DETAILED DESCRIPTION

Figure 1:
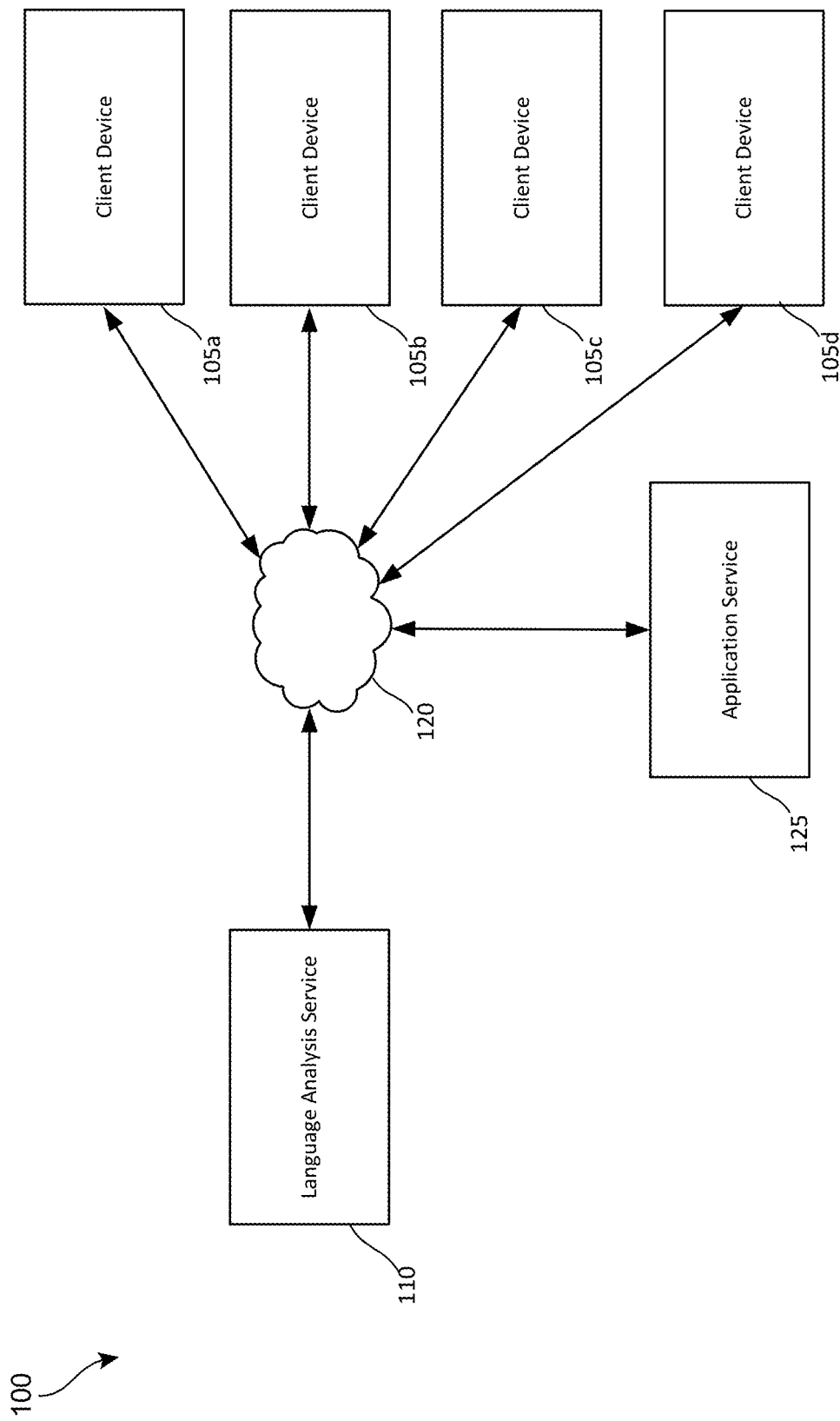
FIG. 1 is a diagram showing an example computing environment in which the techniques disclosed herein may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for implementing and utilizing a readability score for textual content are provided that solve the technical problem of assessing and improving the readability of textual content. The readability score is a metric that represents a measurement the readability of the textual content. The represents an ease with which a typical reader may understand the textual content based on the punctuation and flow of the text. Various factors may impact the readability of textual content, such as poor punctuation, poor capitalization, disfluencies, sentence length, and/or other factors that can impact the reader's ability to understand the textual content. The textual content may be generated by human writers or by NLP models. In some implementations, the readability score is used to provide suggestions for improving the human-generated text and/or for improving the performance of NLP models.

The readability score is determined by breaking the textual content into segments to facilitate analysis. In some implementations, the segmentation is performed by a segmenting NLP model configured to analyze the textual content and to output the segments of the textual content. The segmenting NLP model is configured to predict sentence boundaries, paragraph boundaries, page boundaries, or other segments of textual content depending upon the specific implementation of the segmenting NLP model. Each segment includes a sequence of words. This sequence of words is then analyzed by a readability NLP model that is trained using a vast corpus of textual content and/or domain specific textual content from which the readability NLP model learns how typical textual content and/or domain specific textual content should look. The readability NLP model is trained to output a readability score for each segment. The readability score represents prediction by the readability NLP model that a sequence of words is likely to appear in this vast corpus of textual content and/or textual content. The readability scores for textual content is determined by aggregating the readability scores for each of the segments.

Current automated metrics for assessing the performance of NLP models fail to quantify the readability of the text and have limited utility for ensuring that the models are producing readable text. Instead, the readability of textual output of NLP models is typically assessed using an expensive and labor-intensive manual process in which linguistics experts review the output of the models and manually score the performance of the models.

The manual approach to scoring the performance of the models is slow and not scalable for extensive testing of the performance of the models. Finding and engaging the experts to evaluate the textual output of the NLP models is difficult and expensive. Multiple experts are typically required for this process because individual experts may score the readability of the quite differently. Scores from multiple experts are typically analyzed to account for such ambiguities. Furthermore, reviewing and scoring the textual output manually is a time-consuming process that may take several weeks for a single test. The expert reviewers may evaluate numerous factors regarding the readability of the textual output of NLP models, including but not limited to punctuation accuracy, capitalization, disfluencies that interrupt the flow of the text, and/or other artifacts in the textual output that may obscure the meaning of the textual output. Such approaches often require multiple experts to obtain an unbiased opinion on the readability of the textual content. Further refinement of an NLP model requires that additional testing be performed and manually reviewed, which introduces further delays to the development of the NLP model.

Some automated techniques for scoring the performance of NLP models do exist. However, these current techniques are limited in their ability to assess the readability of the textual output of the NLP models. Many of these metrics, such as the WER, assess the performance of an NLP model based on how accurately the NLP model recognizes words in the source content and transcribes those words into the textual output. However, such lexically focused approaches do not accurately reflect the readability of the textual output as a whole. Spoken language often includes numerous disfluencies that interrupt the flow of otherwise fluent speech. These disfluencies may include but are not limited to breaks in the flow of speech, the inclusion of filler words or utterances, repeated words, false starts, and other artefacts in the speech that interrupt the flow of the speech. Human listeners are typically able to disregard such disfluencies when listening to spoken language but find such disfluencies difficult or distracting when reading textual content derived from the spoken language. Current NLP models typically faithfully transcribe such disfluencies. The readability score provided herein and the techniques for using this readability score take such disfluencies into account when measuring the performance of the NLP model.

Current metrics for assessing the performance of an NLP model also do not account for punctuation and capitalization issues that may also reduce the readability of textual output of the NLP models. Current NLP models often struggle to accurately punctuate and capitalize the textual output. Consequently, the readability of the textual output of NLP models may suffer due to poor punctuation and/or capitalization.

The techniques described above also face similar problems when applied to human-generated textual content. Reviewing and scoring the human-generated textual content using linguistic experts is impractical for similar reasons as discussed above with respect to using such experts to score the performance of an NLP model. Employing experts to analyzing human-generated text is impractical due to the costs to engage the experts and the time required for the experts to analyze the content. Feedback on the readability of the human-generated text would be significantly more helpful if the writer can obtain this feedback in substantially real-time as the writer is writing and/or revising the textual content.

The techniques implemented herein provide a technical solution for implementing and utilizing a readability score to assess the readability of textual content. These techniques assess the readability of human-generated textual content and provide feedback to the user in substantially real-time. This approach significantly improves the user experience in various applications in which the user may generate and/or revises textual content, such as but not limited to word processing applications, presentation applications, messaging platforms, emails, and/or other application in which the user generates and/or revises textual content.

The techniques implemented herein also provide a technical solution for implementing and utilizing a readability score that addresses at least the deficiencies of current techniques for assessing the performance of NLP models. These techniques eliminate the need to engage human experts to review and manually score the textual output of NLP models. These techniques automate the process of assessing the performance of the NLP model and significantly reduce the time and expense of testing. The techniques provided here may also reduce the computing, memory, and network resources associated with developing and testing the new model. The performance of a model may be assessed in a matter of minutes rather than a matter of weeks, which significantly reduces the time required to develop a new model. Furthermore, a technical benefit of the readability score is that the readability score accounts for punctuation, disfluencies, capitalization, sentence length, and/or other artefacts in the textual output of the NLP that impact the readability of the textual output in an objective and repeatable manner. The readability NLP model is trained on a large corpus textual content and/or domain specific textual content which trains the models on how correct punctuation and word sequences look. Consequently, the readability score is used to automate and improve the training of the NLP models to improve the readability of textual output of these models in some implementations. These and other technical benefits of the techniques disclosed herein will be evident from the discussion of the example implementations that follow.

FIG. 1 is a diagram showing an example computing environment 100 in which the techniques disclosed herein for providing readability scoring of the textual output of NLP models may be implemented. The computing environment 100 includes a language analysis service 110. The example computing environment 100 also includes client devices 105a, 105b, 105c, and 105d (collectively referred to as client device 105) and an application service 125. The client devices 105a, 105b, 105c, and 105d communicate with the language analysis service 110 and/or the application service 125 via the network 120. In some implementations, the network 120 is a combination of one or more public and/or private networks and is implemented at least in part by the Internet.

In the example shown in FIG. 1, the language analysis service 110 is implemented as a cloud-based service or set of services. The language analysis service 110 is configured to receive a request to analyze audio, video, textual, and/or other types of content from a client device of the client devices 105a, 105b, 105c, and 105d and/or the application service 125. The language analysis service 110 includes one or more NLP models that are configured to analyze the content and provide a textual representation of the content. In some implementations, the language analysis service 110 includes models for transcribing spoken language from audio or video content, for generating a description of imagery, for summarizing and/or providing suggestions for improving textual content. Other types of NLP models may also be included in other implementations. The NLP models are monolingual or multilingual models in some implementations, and the language analysis service 110 is configured to provide textual output in more than one language in some implementations.

The language analysis service 110 is configured to determine a readability score for improving the training of the NLP models utilized by the language analysis service 110 in some implementations. The language analysis service 110 utilizes the readability score to provide recommendations for improving the readability of textual content, for automatically revising textual content, and/or for providing other services that utilize the readability score in some implementations. Additional details of how the NLP models may be trained and used to analyze textual content and/or provide suggestions for improving readability are described in the examples which follow.

The application service 125 may provide cloud-based software and services that may be accessible to users via the client devices 105a, 105b, 105c, and 105d. The application service 125 may include various types of applications, such as but not limited to communications and/or collaboration platform, a word processing application, a presentation design application, and/or other types of applications. The application service 125 provides means for users to consume, create, share, collaborate on, and/or modify various types of electronic content, such as but not limited to textual content, imagery, presentation content, web-based content, forms and/or other structured electronic content, and other types of electronic content in some implementations. The application service 125 provides means for users to collaborate on the creation of the electronic content in some implementations. The application service 125 provide a communication platform for users to communicate via email, text messages, audio and/or video streams as part of a communication session in some implementations. Additionally, the application service 125 receives various types of structured textual content, unstructured textual content, imagery, audio, and/or video content that may be analyzed by the language analysis service 110 to obtain textual content that support the various services provided by the application service 125 in some implementations.

The application service 125 submits textual content to the language analysis service 110 to obtain a readability score for the textual content and/or recommendations for improving the readability of the textual content. The recommendations may be used to improve the readability of the text of transcriptions of spoken language, improve textual content of text included in various types of content, and/or to provide recommendations to a user that the user may apply to improve the readability of the textual content. The example implementations which follow demonstrate how the readability score is determined for textual content by the language analysis service 110 and used to improve the readability of the textual content by the language analysis service 110 and/or the application service 125.

The client devices 105*a*, 105*b*, 105*c*, and 105*d* are each a computing device that implemented as a portable electronic device, such as a mobile phone, a tablet computer, a laptop computer, a portable digital assistant device, a portable game console, and/or other such devices in some implementations. The client devices 105*a*, 105*b*, 105*c*, and 105*d* are implemented in computing devices having other form factors, such as a desktop computer, vehicle onboard computing system, a kiosk, a point-of-sale system, a video game console, and/or other types of computing devices in other implementations. While the example implementation illustrated in FIG. 1 includes three client devices, other implementations include a different number of client devices that may utilize the application service 125 and/or the language analysis service 110. Furthermore, in some implementations, the application functionality provided by the application service 125 is implemented by a native application installed on the client devices 105*a*, 105*b*, 105*c*, and 105*d*, and the client devices 105*a*, 105*b*, 105*c*, and 105*d* communicate directly with the language analysis service 110 over a network connection.

In the example shown in FIG. 1, the language analysis service 110 is shown as a cloud-based service that may be accessed over a network. However, other implementations of the language analysis service 110 is achieved by the application service 125 or by the client devices 105*a*, 105*b*, 105*c*, and 105*d*. In other implementations, the functionality of the language analysis service 110 and/or the application service 125 described herein is carried out on the client devices 105*a*, 105*b*, 105*c*, and 105*d*.

Figure 2:
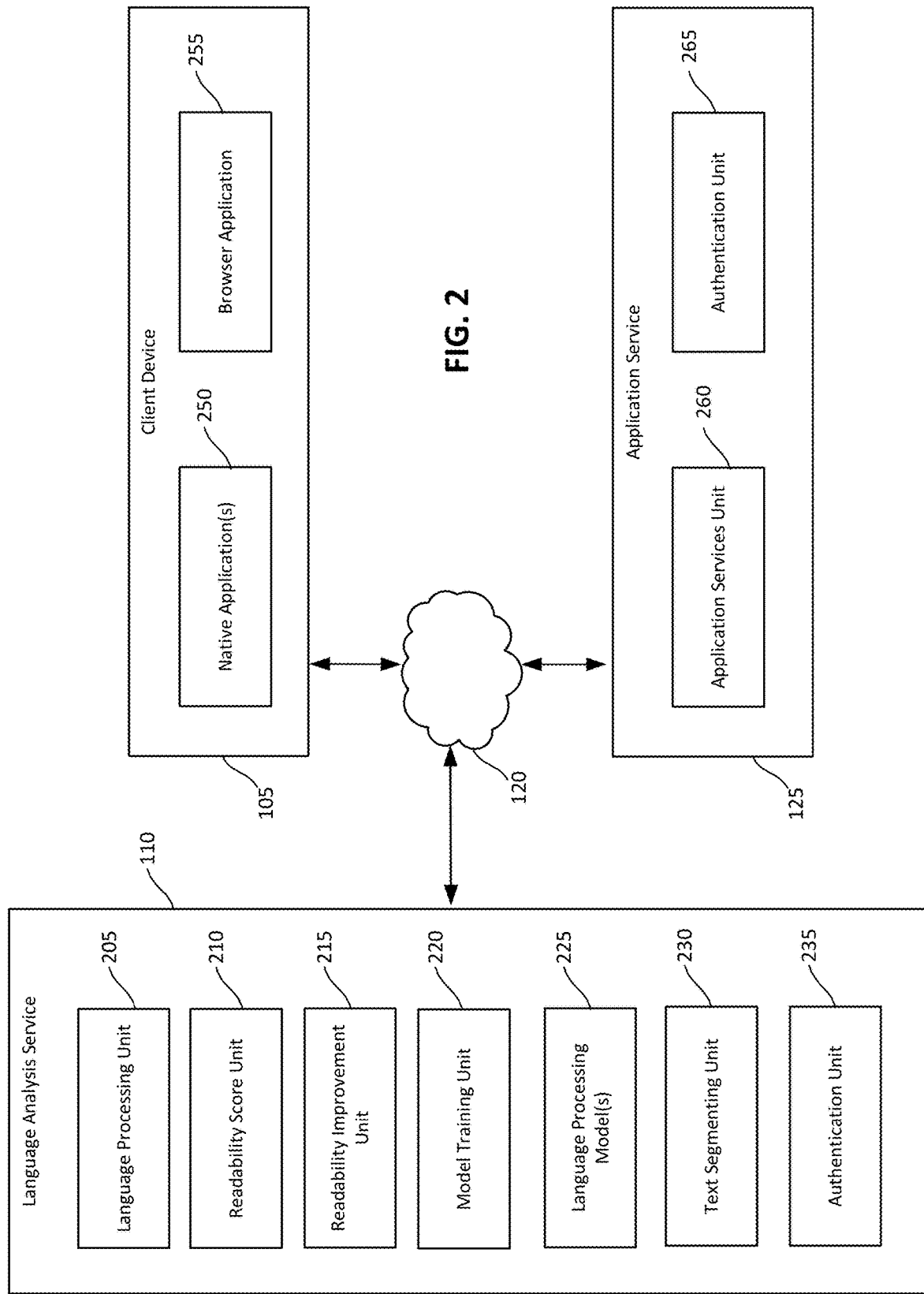
FIG. 2 is an example architecture that may be used, at least in part, to implement the language analysis service shown in FIG. 1.

FIG. 2 is a diagram showing additional features of the language analysis service 110, the client device 105, and the application service 125. The language analysis service 110 may include a language processing unit 205, a readability score unit 210, a readability improvement unit 215, a model training unit 220, one or more language processing models 225, a text segmenting unit 230, and an authentication unit 235.

The language processing unit 205 is configured to receive source content from the application service 125 and/or the client device 105 for analysis. The source content includes, but is not limited to, unstructured textual content, imagery, structured textual content (such as a form, table, or knowledge base), audio content, and/or video content. The source content is textual content that is human-generated textual content in some implementations. The language processing unit 205 is configured to receive a request from the application service 125 and/or the client device 105 that indicates what type of service is being request from the language processing unit 205 in some implementations. For example, the request may specify a request for transcription of audio and/or video content, a readability score for textual content, an improvement recommendation based on the readability score for the textual content, and/or a request for improved text based on the readability score and/or the improvement recommendations determined by the language processing unit 205.

The language processing unit 205 is configured to analyze non-textual inputs to generate textual representations of the non-textual inputs using one or more of the language processing models 225. The language processing models 225 includes an image-to-text model that is configured to analyze image content and to extract textual content from the image content and/or to generate a description of the subject matter of the imagery or of objects included in the imagery in some implementations. The language processing models 225 include a video-to-text model that is configured to analyze video content and to generate a transcript of spoken language detected therein in some implementations. The language processing models 225 include an audio-to-text model that is configured to analyze audio content and to generate a transcript of the spoken language detected therein in some implementations. Other types of models may be provided for analyzing other types of non-textual inputs and for generating a textual output based on these inputs. The specific types of models provided depends at least in part on the types of content that may be provided for analysis by the application service 125 and/or the client device 105. The textual output of the language models may be analyzed in a similar manner as textual input received from the application service 125 and/or the client device 105 in the examples which follow.

The language processing unit 205 performs pre-processing on content to be analyzed by the language processing models 225 in some implementations. The language processing unit 205 is configured to perform feature extraction on the source content to be analyzed by the language processing models 225 to convert the source content into a form that the language processing models 225 can utilize. For audio and/or video content, the language processing unit 205 subdivides the content into short segments to facilitate processing and may perform other processing on the segments to sample frequency information from the audio portion of the content. Other types of preprocessing may be performed on the content to be analyzed by the language processing models 225 in addition to or instead of the preprocessing examples described above.

The text segmenting unit 230 is configured to break textual content into smaller segments for analysis. In some implementations, the text segmenting unit 230 segments textual content output of an NLP model of the language processing models 225 and/or textual content, including human-created textual content, received from the application service 125 or the client device 105 into sentences to prepare the textual content for analysis by the readability score unit 210. The text segmenting unit 230 is configured to use one or more machine learning models trained to segment the textual content in some implementations. The machine learning models are configured to recognize sentence boundaries, paragraph boundaries, page boundaries, etc. As discussed in the examples which follow, the readability score is calculated on a per segment basis for the textual content, and an overall or aggregated readability score for the content may be determined based on the readability scores for the segments that make up the textual content.

The readability score unit 210 is configured to provide a readability score representing a prediction of the readability of a textual content provided by the client device 105, the application service 125, or output of an NLP model of the language processing models 225. The textual content provided by the client device 105 and/or the application service 125 may be human-generated textual content created or modified using an application on the client device 105 or an application provided by the application service 125. The readability score is a metric that represents a measurement of the readability of the textual content. The score represents an ease with which a typical reader may understand the textual content based on the punctuation and flow of the text content and/or other attributes of the textual content. The readability score unit 210 analyzes the textual output of an NLP model to assess the readability of the textual content in some implementations. The readability score may be used to improve the training of the NLP model regarding the readability of the model as discussed with respect to the model training unit 220. The readability score provides an assessment of the readability of human-generated textual content in some implementations and may also be used to provide recommendations to the user for improving the readability of the textual content as will be discussed in the examples which follow.

The readability score unit 210 is configured to utilize a scoring model of the language processing models 225 to generate the readability score for a textual input. The readability score generated by the scoring model may account for numerous factors when determining the readability score, such as but not limited to punctuation, capitalization of words, sentient length, and disfluencies. The readability score is output by the scoring model in response to analyzing textual content provided as an input to the scoring model. The NLP models are trained to generate the readability score by the model training unit 220 as discussed in the examples which follow. In some implementations, the readability score is a numeric value that represents the readability of the textual content provided as an input to the scoring model. In some implementations, the scoring model assigns a floating-point readability score that falls into a range from 0 to 1, where a value of zero represents a lowest assignable readability score and a value of 1 represents a highest assignable readability score. Additional details of how the score may be determined by the scoring model and how the scoring model may be trained are discussed in the examples which follow.

The readability improvement unit 215 is configured to provide recommendations for alternative text which has an improved readability score compared with a human-created textual input obtained from the client device 105 and/or the application service 125. The readability improvement unit 215 provides feedback to a user creating or editing an electronic document via the client device 105 and/or the application service 125 to improve the readability of the textual content in some implementations. The readability improvement unit 215 is configured to provide the textual content as an input to one or more NLP models of the language processing models that are configured to analyze the textual input to automatically revise or rephrase a textual input. The NLP models are trained to identify and recognize problems with punctuation, capitalization, disfluencies, and/or other issues that may negatively impact the readability of text. The NLP models revise the punctuation and/or capitalization, remove disfluencies, and/or rephrase the textual content to clarify the readability of the textual content. The readability improvement unit 215 provides the textual input as an input to multiple NLP models 225, obtain a candidate revised textual output from each of the models, and obtain a readability score for each of the candidate revised textual outputs from the readability score unit 210. The readability improvement unit 215 selects alternative text from among the candidate revised textual outputs by selecting a candidate having a highest readability score in some implementations. The language analysis service 110 provides the alternative text to the client device 105 and/or the application service 125. The recommendation of alternative text is discussed in greater detail in the examples which follow.

The model training unit 220 is configured to train the language processing models 225. The model training unit 220 may assess the performance of the NLP models of the language processing models 225 using the readability score metric. The model training unit 220 may also utilize one or more additional metrics in addition to the readability score metric when assessing the performance of the NLP models.

The model training unit 220 utilizes the readability score when training the NLP models to improve the readability of the textual output provided by the NLP models in some implementations. The model training unit 220 utilizes various training techniques to improve the readability score for textual content output of the NLP models. The specific techniques utilized for training the models depends at least in part on the type of machine learning model used to implement the NLP models. The model training unit 220 tests the performance of an NLP model by providing reference content as an input to the NLP model and comparing the textual content output by the NLP model with reference textual content that represents the expected output of the NLP model for the reference content. An NLP model may go through multiple iterations of testing that include processing multiple reference inputs and comparing the textual output with reference textual output.

The model training unit 220 uses the readability score when testing the performance of an NLP model during training of the model in some implementations. The model training unit 220 provides a set of reference input data to the NLP model to obtain textual content output by the model. The model training unit 220 provides the textual content output of the model to the readability score unit 210 to obtain a readability score for each output from the model. The model training unit 220 determines an aggregate readability score by averaging the scores of the textual content output of the model. The model training unit 220 determines whether the version of the model being tested provides an improvement over a prior version of the model by comparing the aggregate readability score with the aggregate readability score achieved by a reference version of the model. The reference version of the model may be a previous iteration of the model that achieved a highest aggregate readability score when processing the reference input data. The model training unit 220 upgrades the version of the NLP model included in the language processing models 225 in response to the testing indicating that the version of the NLP model under test is outputting textual content that has higher readability score than the version of NLP model currently in use by the language analysis service 110.

In addition to the readability score metric, the model training unit 220 also utilizes the WER as a metric for assessing the performance of the one or more NLP models of the language processing models 225 in some implementations. As discussed above, the WER alone is often insufficient for assessing performance of the NLP models. However, in combination with the readability score, the WER metric may be used to provide further improvements in the performance of the NLP models. The WER metric assesses the lexical performance of the NLP model by measuring how accurately the model recognizes the words included in the source content and by determining whether the words included in the textual output generated by the NLP model matches the words included in a reference text. The accuracy of the readability score may be improved by using the WER to improve the accuracy of the NLP models prediction of the words included in the source content. Consequently, the accuracy and quality of the predictions made by the NLP models may be significantly improved by training the models using both the readability score and the WER to increase the readability score while decreasing the WER.

The model training unit 220 determines the WER using the following approach in some implementations:

$$WER = \frac{S+D+I}{N}$$

where S represents a number of substitutions of words made in the textual output of the NLP model with the reference, D represents a number of words included in the reference textual content but not included in the textual content output by the NLP model, and I represents a number of words inserted into the textual output of the NLP that were not included in the reference text.

The one or more language processing models 225 are used by the language analysis service 110 service to analyze source content and output textual content. The language analysis service 110 supports multiple types of source content in some implementations and provides NLP models configured to generate textual content from each of these sources. The source content may include but is not limited to audio content, video content, images, electronic documents, structured and/or unstructured textual content. The type of source content may depend on the types of applications provided by the client device 105 and/or the application service 125. For example, a communications platform may provide streaming audio or video content from an online communication session for which a transcript of the communication session is desired. Other applications may provide textual content from a word processing document, text from a presentation document, text from an email or other type of communication, and/or other types of text-based content. Other applications may provide image content from which textual content may be extracted. For example, an application may obtain an image that may include textual content and provide the image to the language analysis service 110 to extract the text from the image. Other types of models may be used, and some models may be configured to analyze more than one type of source content.

The language processing models 225, including the scoring model used by the readability score unit 210, may be implemented by various types of deep learning models and the language processing models 225 may include more than one type of model. As shown in FIG. 4, the language processing models 225 are developed by the model training unit 220 from pretrained language models (PLMs) 405 and fine-tuning training data 410. PLMs 405 are language models that have been pretrained on large-scale unsupervised corpus of textual content. This enables the PLMs 405 to understand natural language accurately and to express content in human language fluently, both of which are important abilities for fulfilling text generation tasks. Bidirectional Encoder Representations from Transformers (BERT) or the OpenAI Generative Pretrained Transformer (GPT) language models are examples of two of the PLMs that are used to implement one or more of the language processing models 225 in some implementations. In other implementations, other PLMs are used in addition to or instead of these PLMs.

The PLMs 405 provide a robust model that is fine-tuned by the model training unit 220 using the fine-tuning training data 410 to fine-tune the models for the various services provided by the language analysis service 110 described herein. Utilizing a PLM as a starting point for developing the language processing models 225 provides several significant technical benefits. The amount of training data required to train the language processing models 225 is significantly reduced compared with training a completely new NLP model. Training a new NLP model is time consuming and computationally intensive. The PLMs are pretrained to provide accurate and fluent text generation and the behavior of the PLM need only be fined-tuned to provide desired functionality. In some implementations, the scoring model is implemented using a PLM that has been fine-tuned using fine-tuning training data 410 configured to teach the model how to generate a readability score for the segment of text provided as an input to the model. Consequently, the amount of the fine-tuning training data 410 required to train the language processing models 225 is significantly reduced compared to the amount of training data that would be required to train a new model. Producing training data is an expensive and time-consuming process. Training data for training the NLP models is often human labeled to ensure that the models are being trained with data that matches human expectations, which is a manual and time-consuming process. By starting with a PLM 405, the cost, time, and computing resources required to train the language processing models 225 may be significantly reduced.

In some implementation, the fine-tuning training data 410 includes domain-specific textual content used to train the language processing models 225 on textual content for a specific domain or enterprise. The fine-tuning training data 410 can include training data for specific topics that include special language or terminology that is typically not found in the corpus of textual content used to train the PLMs 405. For example, the fine-tuning training data 410 may include training data that uses special language or terminology used in medicine when training the language processing models 225 to analyze medical textual content. In some implementations, the fine-tuning training data 410 includes enterprise specific training data. A corporation may use specific terminology that is not commonly used and would not be commonly found in the corpus of textual content used to train the PLMs 405. Assessment of the readability of the textual content analyzed by the language processing models 225 can be improved by fine-tuning the performance of these models using domain-specific training data.

Referring back to FIG. 2, the authentication unit 235 provides means for verifying whether users are permitted to access the services provided by the language analysis service 110. The authentication unit 235 provides means for receiving authentication credentials for the users from their respective client devices 105 or via the application service 125. The authentication unit 235 is configured verify that the authentication credentials are valid and permit the user to access the services provided by the language analysis service 110.

In some implementations, the application service 125 includes an application services unit 260 and/or an authentication unit 265. The application services unit 260 is configured to provide means for users to consume, create, share, collaborate on, and/or modify various types of electronic content. The application services unit 260 provides a web-based interface to enable users to access at least a portion of the services provided by the application service 125. In other implementations, users access the services provided by the application service 125 via one or more native applications 250. The application services unit 260 obtain the various readability services provided by the language analysis service 110.

The authentication unit 265 provides means for verifying whether users are permitted to access the services provided by the application service 125 and/or the language analysis service 110. The authentication unit 265 provides means for receiving authentication credentials for the users from their respective client device 105. The authentication unit 265 is configured to verify that the authentication credentials are valid and permit the users to access the services provided by the application service 125 and/or the language analysis service 110 responsive to the authentication credentials being valid.

The client device 105 include one or more native applications 250 and/or a browser application 255 in some implementations. The one or more native applications 250 are an application developed for use on the client device 105 and include an application that may communicate with the application service 125 to enable users to consume, create, share, collaborate on, and/or modify electronic content. The browser application 255 is an application for accessing and viewing web-based content. In some implementations, the application service 125 provides a web application that enables users to consume, create, share, collaborate on, and/or modify content. A user of the client device 105 accesses the web application, and the web application renders a user interface for interacting with the application service 125 in the browser application 255. The application service and/or the language analysis service 110 supports both the one or more native applications 250 and the web application in some implementations, and the users may choose which approach best suits their needs. The language analysis service 110 may also provide support for the one or more native applications 250, the browser application 255, or both to provide a means for a user of the client device 105 to obtain the services provided by the language analysis service 110.

FIG. 3A is a diagram that illustrates an example transcript of human speech generated using a voice-to-text model of the language analysis service 110. In this example, the client device 105 or the application service 125 sends audio content from an online meeting to the language analysis service 110 to obtain a transcript of the online meeting. The client device 105 or the application service 125 transmit an audio or video stream associated with the online meeting to the language analysis service 110 for processing. While this example describes processing of textual content output by an NLP model, similar processing may be applied to human-generated textual content obtained from the client device 105, the application service 125, or another source.

The language processing unit 205 provides the textual content to the text segmenting unit 230 to segment the content prior to determining the readability score for the textual content. The language processing unit 205 is configured to provide the segmented textual content as an input to the scoring model to obtain a segment readability score for each of the segments of the textual content. The scoring model then analyzes the sentence to determine the likelihood that each segment is a sentence. One approach that may be used by the scoring model is considering a probability that the sequence of words that make up the segment make up a sentence based on the pretraining that the model received on a corpus of textual content and/or domain-specific textual content. The scoring model may be fine-tuned to recognize the characteristics of a typical sentence. The scoring model is trained to recognize the occurrence of disfluencies, filler words, and missing or erroneous punctuation that impact the readability of the segment and may assign a score that indicates that there are issues with the segment that impact the readability of the candidate sentence derived from this segment in some implementations. The scoring model incrementally increases the score associated with a segment for each disfluency, punctuation error, or other artefact in the textual content that impacts the readability of the content in some implementations. In such implementations, a higher score indicates that the candidate sentence derived from the segment is less readable than a candidate sentence having a lower score. In other implementations, the scoring model assigns a default readability score to each candidate sentence and decrease the readability score for each disfluency, punctuation error, or other artefact in the candidate sentence that may impact the readability of the content.

The example shown in FIG. 3A, a first segment 305 of the transcript is shown that includes a first candidate sentence. The first segment 305 is a portion of the textual content. The textual content is output by an NLP model of the language processing models 225 that has processed audio or video content that includes spoken language. The audio or video content may, for example, be part of an online meeting, a presentation, or other audio or video content for which a transcript of the spoken language is desired.

The language processing unit 205 submits the first segment 305 to the readability score unit 210 to obtain the first readability score 310. In this example, the readability score unit 210 generates a readability score of 0.67, where the readability score falls within a range of 0 to 1, and a higher readability score indicates that the first segment 305 is more readable. The first segment 305 includes several disfluencies which are highlighted in bold text.

The language processing unit 205 compares the readability score 310 to a readability threshold in some implementations to determine whether to provide recommendations for alternative version of the textual content that have a higher readability score. In such implementations, the language processing unit 205 requests that the readability improvement unit 215 analyze the first segment 305 and provide an alternative text that may have better readability than the segment 305 in response to the readability score 310 falling below the readability threshold. The readability improvement unit 215 provides the segment to 305 to one or more NLP models of the language processing models 225 that have been trained to reword or rephrase an input text to improve the clarity of the text. The readability improvement unit 215 obtains a textual output from each of the one or more NLP models and provides each of the textual outputs to the readability score unit 210 to obtain a readability score for each alternative text segment. If the readability score for a particular alternative text indicates that the readability of the alternative text is an improvement over the first segment 305, the readability improvement unit 215 provides the alternative text to the language processing unit 205 along with the readability score associated with the alternative text. The language processing unit 205 may include the alternative text in the transcript being generated instead of the segment 305. If multiple alternative texts provide an improvement in readability over the segment 305, the readability improvement unit 215 ranks the alternative texts based on their readability score and provides the alternative text with the most improvement in readability over the segment 305 to the language processing unit 205. In the example shown in FIG. 3A, the alternative text 315 is associated with a higher readability score 320 than readability score 310 associated with the first segment 305. The alternative text 315 still includes some disfluencies but is more readable than the text of the first segment 305 prior to processing.

FIG. 3B is a diagram that illustrates an example transcript of human speech generated by the language analysis service 110 using three different voice-to-text NLP models. All three of the NLP models received the same input based on the audio content that includes the human speech. This example demonstrates how differences in punctuation may impact the readability of the text output by the NLP models. The language processing unit 205 provides the textual content output by each NLP model to the readability score unit 210 to obtain a readability score. In this example, the first textual output 325 obtained from the first NLP model received a first readability score 330 of 0.77, the second textual output 335 obtained from the second NLP model received a second readability score 340 of 0.71, and the third textual output 345 obtained from the third NLP model received a third readability score 350 of 0.83. These examples demonstrate how different NLP models may handle the punctuation differently and how those differences may impact the readability of the textual output of the models. A certain model may perform better on one input while another model may perform better on another input. A technical benefit of the techniques provided herein is that the language analysis service 110 may utilize multiple NLP models for voice-to-text, video-to-text, and/or other content-to-text conversions, determine a readability score for the textual content obtained from each of the models, and select the textual output that has the highest readability score to include a transcript, document, or other electronic content derived from the source content. Furthermore, as discussed in the preceding examples, the language analysis service 110 segments the textual content provided to the scoring model into separate sentences, paragraphs, sections, or other subsections of the textual content. The textual content output by each of the models and the respective readability score associated with each textual content is provided to the readability improvement unit 215, which may generate a cumulative version of the textual content in which each respective segment is selected from among the segments generated by each of the NLP models. Accordingly, the cumulative version of the textual content includes the most readable version of each segment produced by the NLP models to provide a more readable version of the textual content.

In implementations where the textual content is human-generated textual content, the readability score is presented to the user via a user interface provided by the client device 105 or the application service 125 in some implementations. The readability score provides the user with an assessment of the readability of the textual content. Furthermore, the readability improvement unit 215 may be configured to generate alternative text based on the human-generated textual content that has a higher readability score. The alternative text is presented to the user on a user interface of the client device 105, and native application 250 or the browser application 255 is configured to permit the user to substitute the alternative text provided by the readability improvement unit 215 for the corresponding human-generated textual content in some implementations.

Figure 5A:
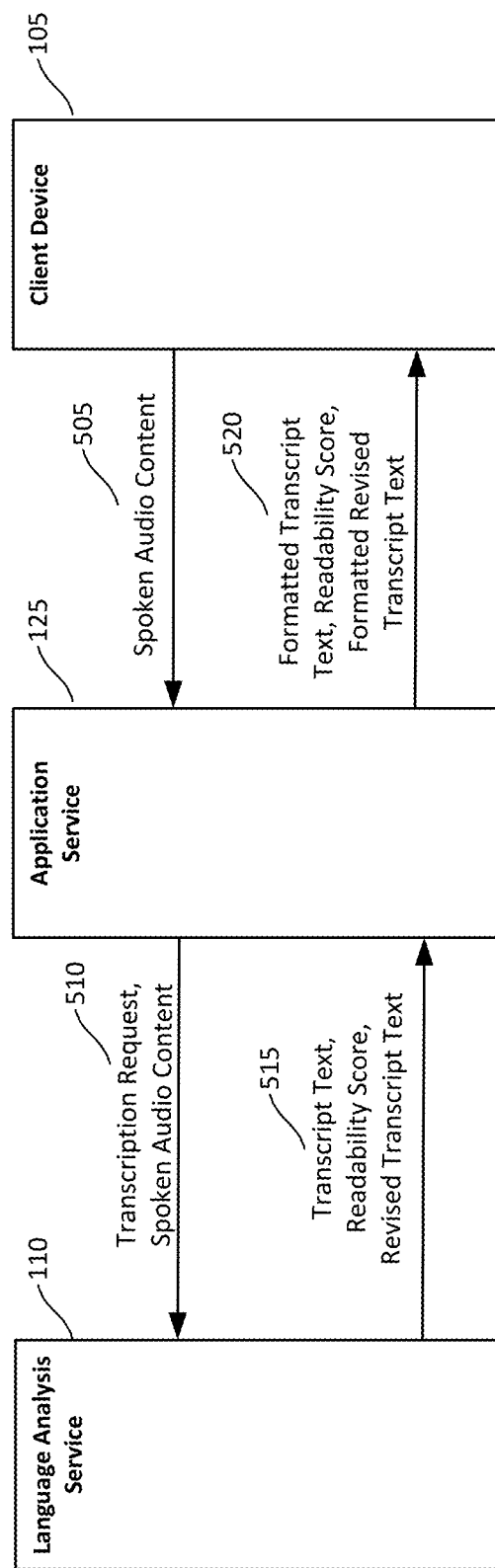
FIG. 5A is a diagram showing an example of the information that may be exchanged among the language analysis service, the application service, and the client device during a transcription session in which a transcript of audio content captured by the client device is generated.

FIG. 5A is a diagram showing an example of the information that may be exchanged among the language analysis service 110, the application service 125, and the client device 105 during a transcription session in which a transcript of audio content captured by the client device 105 is generated. In this example, the client device 105 sends spoken audio content 505 captured by the client device 105. The spoken audio content 505 includes spoken content captured by the native application 250, the browser application 255, or other applications on the client device 105. The spoken audio content 505 may be, for example, content from an online presentation or meeting for which a transcript is to be created. In yet other implementations, the spoken audio content is dictated content that is provided for conversion into textual content to be used in an application on the client device 105 that is provided by the application service 125. The process shown in FIG. 5A may be performed in substantially real time. The client device 105 continues to stream the spoken audio content 505 for the duration of the transcription session in some implementations, and the language analysis service 110 continues to send transcription text to the application service 125 as the transcript text is generated during the transcription session. While the example implementation shown in FIG. 5A includes a single client device, other implementations may include multiple client devices for multiple participants to an online meeting or presentation and spoken audio content may be obtained from multiple client devices 105 and the transcript text may be provided to the client devices 105 of each of the participants.

The client device 105 streams the spoken audio content 505 to the application service 125, and the application service 125 streams the application content and a transcription request 510 to the language analysis service 110 for processing in the example shown in FIG. 5A. In some implementations, the native application 250, the browser application 255, or other application on the client device 105 optionally generates a transcription request that may be sent to the application service 125 with the spoken audio content 505. The application service 125 processes the spoken audio content 505 to generate the spoken audio content 510 or simply stream the spoken audio content 505 received from the client device 105 to the language analysis service 110.

In response to receiving the transcription request and the spoken audio content 510, the language processing unit 205 of the language analysis service 110 receives and processes the spoken audio content 510 to generate a text transcript of the speech included in the spoken audio content. The language processing unit 205 preprocess the spoken audio content 510 to perform feature extraction and/or other processing to convert the spoken audio content 510 into a form suitable as an input to one or more NLP models of the language processing models 225 in some implementations.

Each of the one or more NLP models output a candidate transcript text. The language processing unit 205 provides each candidate transcript text to the readability score unit 210 to obtain a respective readability score for the transcript. The language processing unit 205 selects a candidate transcript from among the candidate transcript outputs by the one or more NLP models based on the respective readability scores of the candidate transcripts. The language processing unit 205 provides the selected candidate transcript to the readability improvement unit 215 to obtain suggestions for improving the selected candidate transcript. The readability improvement unit 215 provides a revised version of the transcript text that has been revised to improve the readability of the textual content. The readability improvement unit 215 obtains a readability score for the revised textual content.

The language processing unit 205 provides a response 515 to the application service 125 that includes the selected candidate transcript and the readability score. The response 515 may also include the revised transcript (if any was determined) and the readability score associated with the revised transcript. The application service 125 may transmit the transcripts and readability scores received from the language analysis service 110 to the client device 105. In some implementations, the application service 125 may optionally apply formatting to the text of the transcript and/or the revised transcript before transmitting the formatted transcript text, the readability score for the formatted transcript text, formatted revised transcript, and the readability score for the revised transcript text to the client device 105.

Figure 5B:
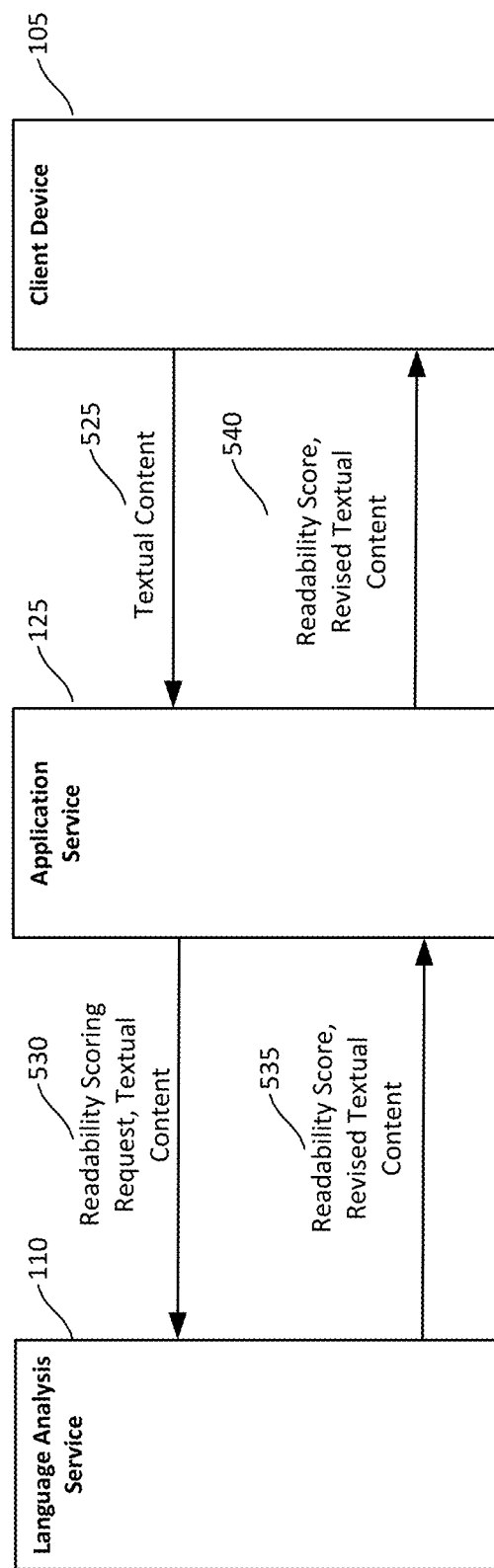
FIG. 5B is a diagram showing an example of the information that may be exchanged among the language analysis service, the application service, and the client device during a session in which an electronic document is being created or modified by a user.

FIG. 5B is a diagram showing an example of the information exchanged among the language analysis service 110, the application service 125, and the client device 105 during a session in which an electronic document is being created or modified by a user and the language analysis service 110 is used to analyze human-created textual content. The electronic document may be a word processing document, a presentation document, an email message or other type of message, and/or other types of textual electronic document. The electronic document may be edited in the native application 250 or the browser application 255.

The client device 105 sends textual content 525 from the electronic document to the application service 125. The client device 105 includes a readability scoring request (not shown) with the textual content 525. The textual content 525 may be a sentence, phrase, paragraph, or other segment of the textual content of the electronic document. The segment of the document is selected by a user of the client device 105 or is automatically identified by the native application 250 or the browser application 255. For example, the native application 250 or the browser application 255 may select a segment of the electronic document where the cursor is positioned within the electronic document, a segment of the document that the user has clicked on or highlighted, a segment of the document which the user is editing or has recently edited, or other segments of the document. The application service 125 receives the textual content from the client device 105 and sends a readability scoring request and the textual content 530 to the language analysis service 110.

In response to receiving the readability scoring request and the textual content 530, the language processing unit 205 of the language analysis service 110 provides the textual content 530 to the readability score unit 210 to obtain a readability score for the textual content. The language processing unit 205 provides the textual content to the readability improvement unit 215 to obtain suggestions for improving the textual content. The readability improvement unit 215 provides a revised version of the textual content that has been revised to improve the readability of the textual content.

The language processing unit 205 provides a response 535 to the application service 125 that includes the readability score and the revised textual content (if any) to the application service 125. The application service 125 transmits the readability score and the revised textual content 540 to the client device 105. The client device may present the readability score and/or the revised textual content to the user. FIG. 6B, discussed in detail below, shows an example of a user interface 650 of an application in which the readability score and/or the revised textual content may be presented to the user.

Figure 6A:
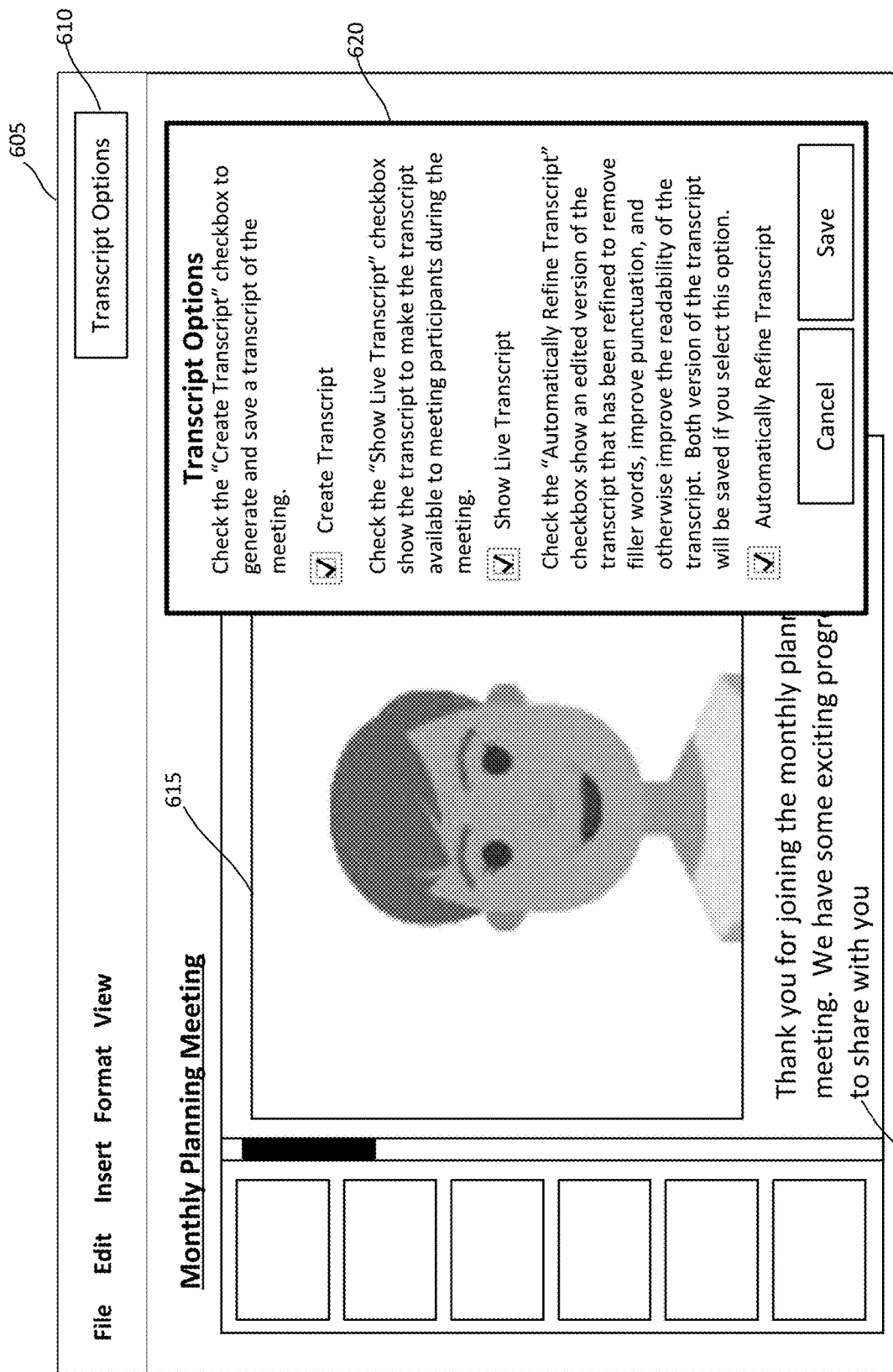
FIG. 6A shows an example user interface for an application that may be implemented by the native application or the browser application of the client device.
Figure 6B:
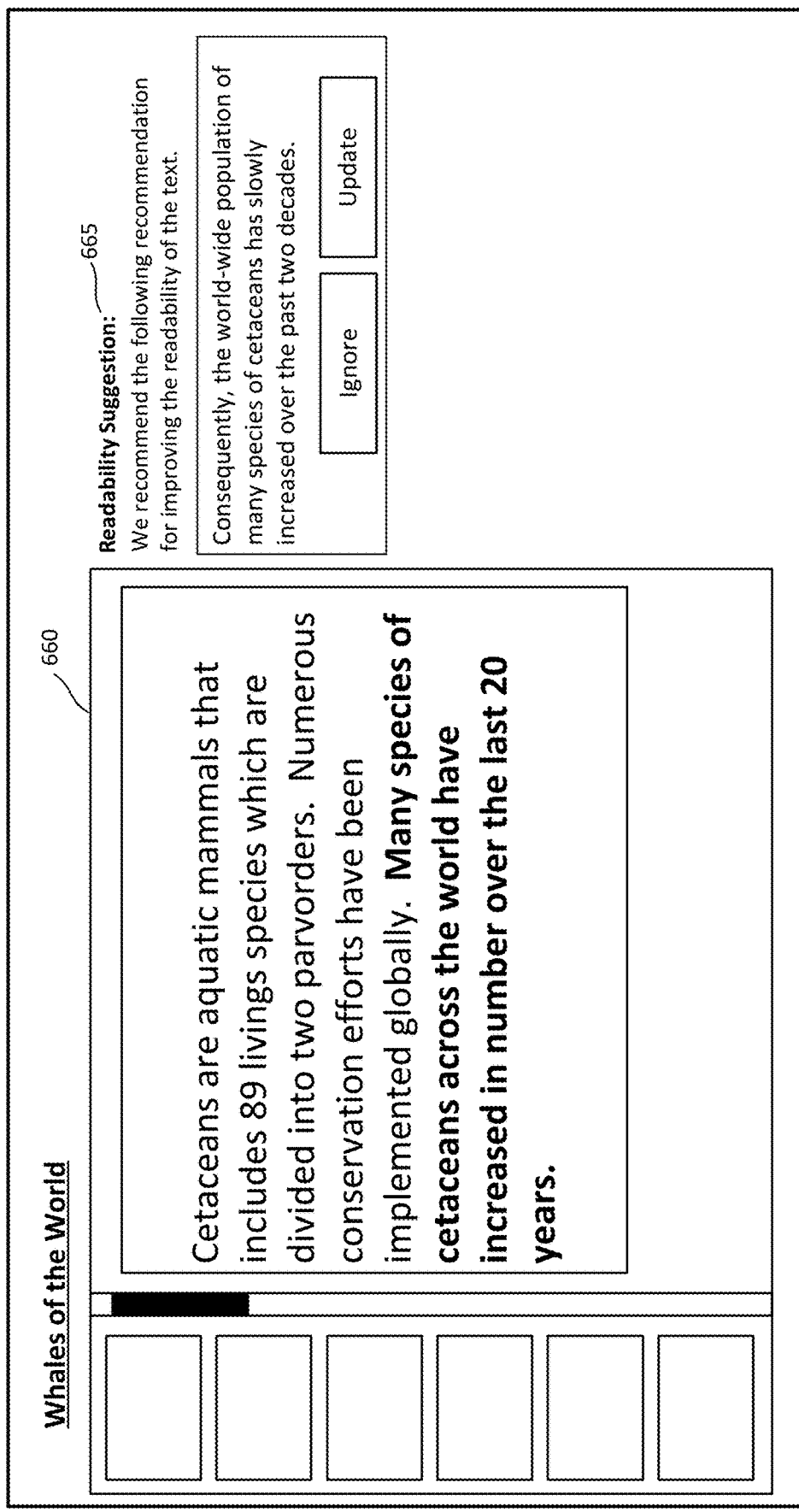
FIG. 6B shows another example user interface for an application that may be implemented by the native application or the browser application of the client device.

FIG. 6A shows an example user interface 605 for an example presentation application implemented by the native application 250 or the browser application 255 of the client device 105. The presentation application is implemented as a cloud-based application by the application services unit 260 of the application services 125 in some implementations, and a user of the client device 105 accesses the application via the browser application 255. The user interface includes a presentation panel 615, a transcript options button 610, and a transcript display area 625. The presentation panel 615 may display a video stream of a presenter, slides or other presentation content, or a combination thereof. The transcript options button 610 allows the presenter to configure the transcript options for the presentation. The transcript may be generated dynamically in substantially real time during the presentation using the process described in FIG. 5A.

The transcription options configuration panel 620 is displayed in response to the transcript options button 610 being clicked on or otherwise activated in some implementations. The transcript configuration panel 620 includes a "Create Transcript" checkbox that, when checked, enables the presenter to enable the creation of transcripts for the presentation session. This option causes the application service 125 and/or the client device 105 to generate a transcript of the spoken language from the presentation session. The transcript may be stored as a file on the application service 125 that is accessible to participants of the presentation session during and/or after the presentation session. The transcript configuration panel 620 also includes a "Show Live Transcript" checkbox that, when checked, enables the display of the transcript in substantially real time as the transcript segments are received from the language analysis service 110. The transcription options configuration panel 620 includes an "Automatically Refine Transcript" checkbox that, when checked, causes the revised transcript text generated by the language analysis service 110 to be presented in the transcript display area. The revised transcript generated by the language analysis service 110 may have a much higher readability than the unrevised transcript text, which may significantly improve the user experience for participants to the online presentation. Participants who are consuming the transcript in substantially real time during the online presentation are presented with the refined transcript when the "Automatically Refine Transcript" checkbox is checked. Both the original version and the refined versions of the transcript may be stored by the application service 125 and made accessible to participants of the online presentation.

FIG. 6B shows an example user interface 650 for an example presentation application that implemented by the native application 250 or the browser application 255 of the client device 105. The user interface includes a presentation panel 660 and a readability suggestion panel 665. The presentation panel 660 shows contents of a slide of the presentation. The slide contents include text, images, video, and/or other content. The slide content may be revised in the presentation panel 660. The readability suggestion panel 665 may display recommendations for improving a segment of the document. The segment of the document is highlighted in the section of text shown in the presentation panel 660. The readability suggestions are generated dynamically in substantially real time as the user views and/or modifies the presentation content using the process described in FIG. 5B. The readability suggestion panel 665 includes controls for updating the presentation content based on the suggestion or for ignoring the proposed edit to the content.

Figure 7:
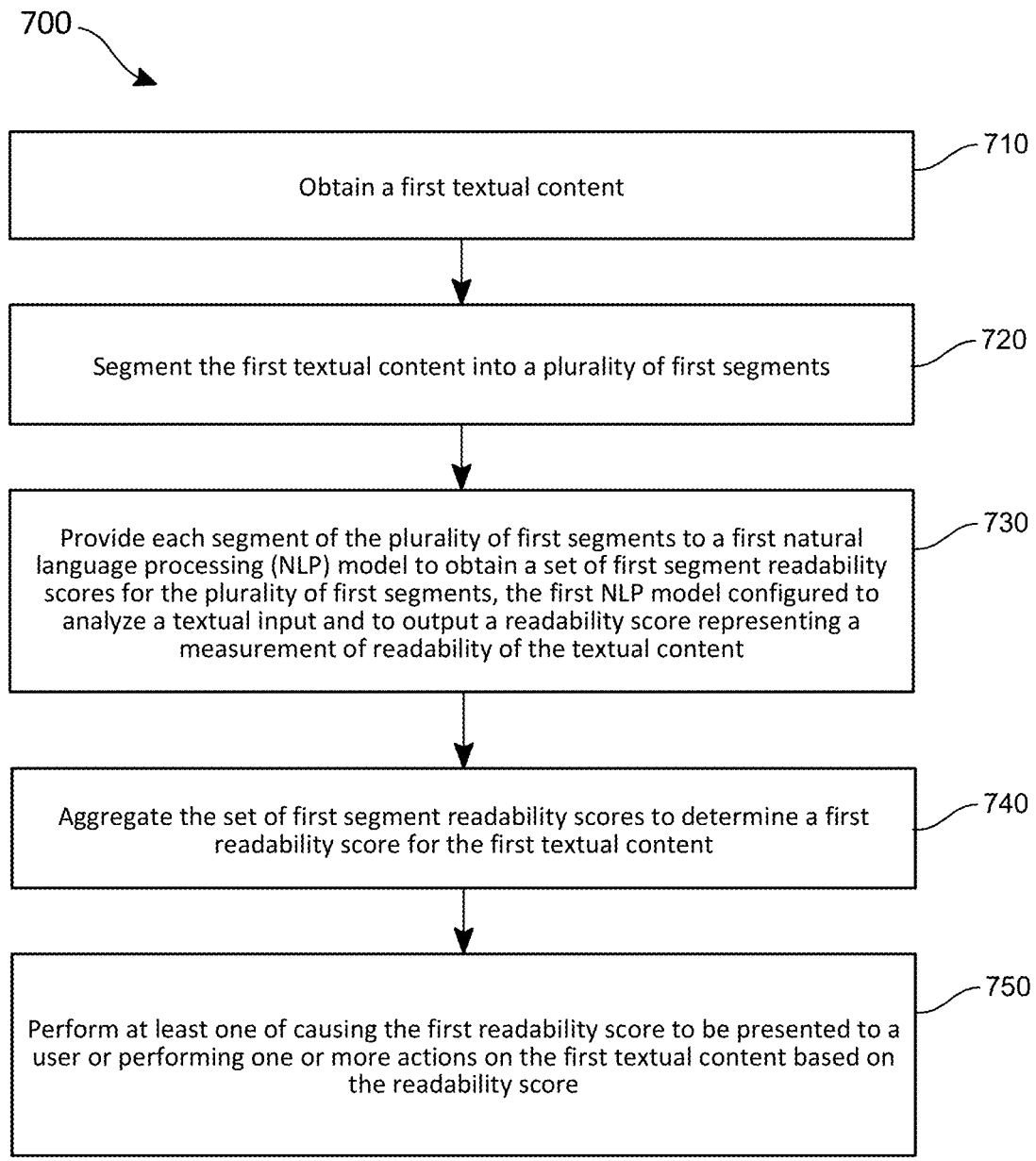
FIG. 7 is a flow diagram of a process for generating a readability score for textual content that may be implemented by the language analysis service.

FIG. 7 is an example flow chart of an example process 700 that may be implemented by the language analysis service 110. The process 700 includes an operation 710 of obtaining a first textual content. The first textual content may be a human-created textual content or may be textual content output by an NLP model. For example, the textual content may be obtained by analyzing non-textual input content using an NLP model configured to output the textual content based on the non-textual input content. As discussed in the preceding example implementations, various types of input content may be analyzed by the NLP model to generate a textual output. For example, in some implementations, the NLP model generates a transcript of spoken language in audio or video content. The NLP model may generate a description of an image input or extract other types of information from the image. Other types of content may be analyzed in other implementations.

The process 700 includes an operation 720 of segmenting the first textual content into a plurality of first segments. As discussed in the preceding examples, the language analysis service 110 segments the first textual content provided to the scoring model into separate sentences, paragraphs, sections, or other subsections of the textual content.

The process 700 includes an operation 730 of providing each segment of the plurality of first segments to a first natural language processing (NLP) model to obtain a set of first segment readability scores for the plurality of first segments, the first NLP model configured to analyze a textual input and to output a readability score representing a measurement of readability of the textual input. As discussed in the preceding examples, the scoring model analyzes the scoring model analyzes each of the sentences or other segments of textual content.

The process 700 includes an operation 740 of aggregating the set of first segment readability scores to determine a first readability score for the first textual content. In some implementations, the readability score may be determined by determining an average of the set of first segment readability scores.

The process 700 includes an operation 750 of perform at least one of causing the first readability score to be presented to a user or performing one or more actions on the first textual content based on the readability score. As discussed in the preceding examples, the language analysis service 110 performs various actions on the first textual output based on the readability score determined by the readability score unit 210. For example, in implementations where the first textual output is a transcript of a spoken language, the language analysis service 110 processes the first textual output using the readability improvement unit 215 to generate a revised version of the transcript to attempt to improve the readability of the transcript and present the revised version of the transcript to participants of the presentation or online communications session. In other implementations, the language analysis service 110 provides the first readability score to a user and/or provide alternative text with an improved readability score to the user.

The detailed examples of systems, devices, and techniques described in connection with FIGS. 1-7 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
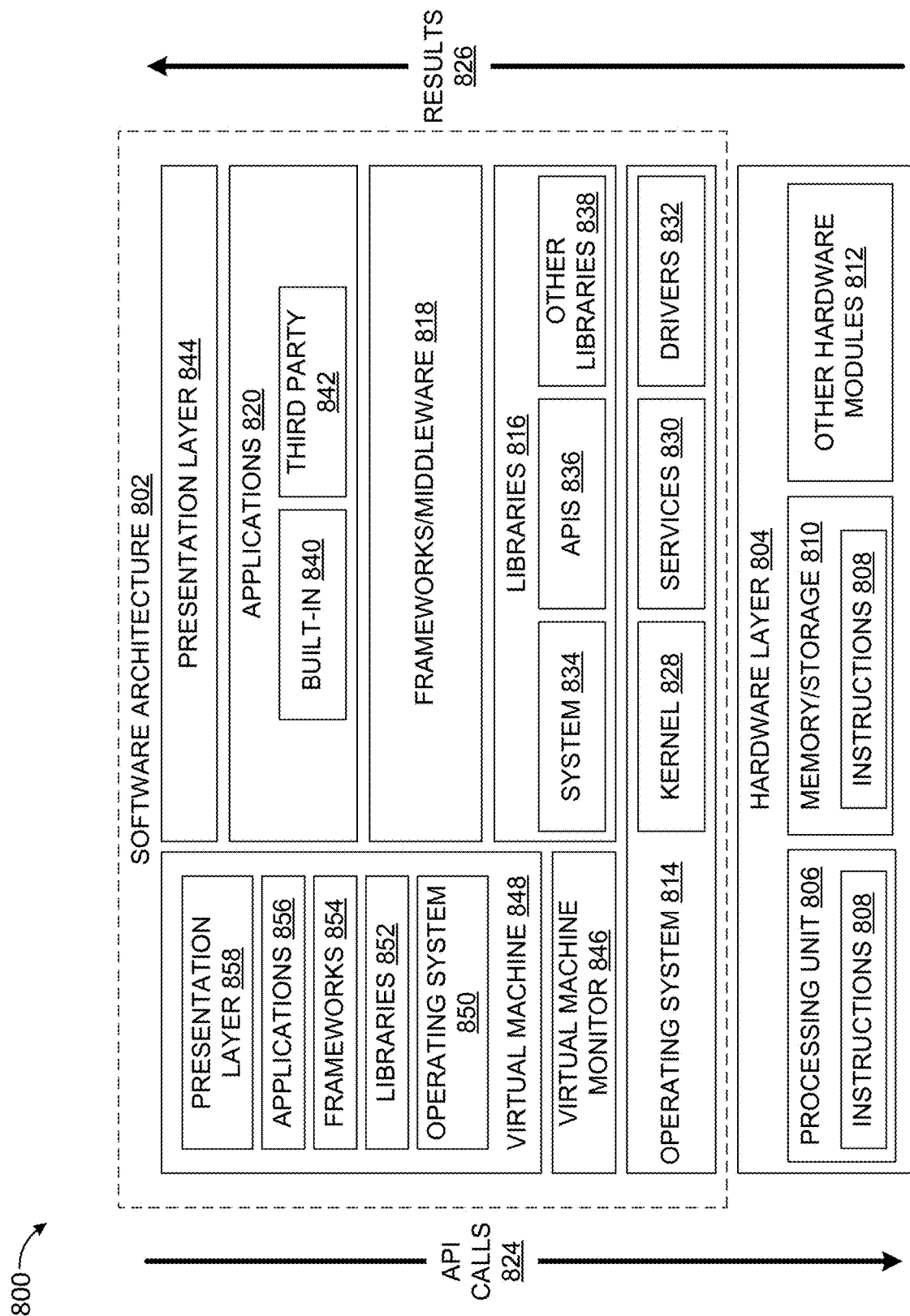
FIG. 8 is a block diagram showing an example software architecture, various portions of which may be used in conjunction with various hardware architectures herein described, which may implement any of the described features.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
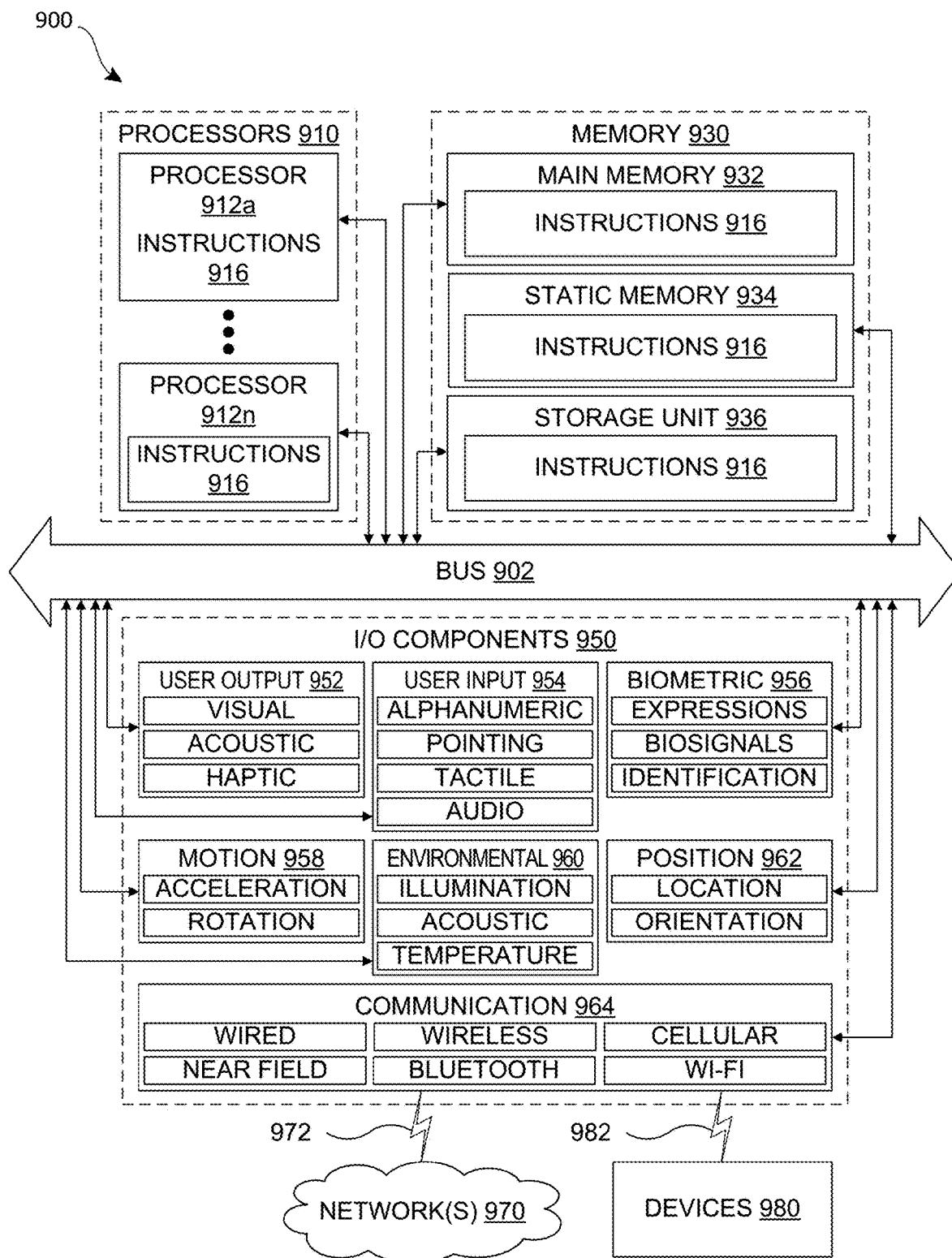
FIG. 9 is a block diagram showing components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS)

receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 964, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable storage medium storing executable instructions that, when executed, cause the processor alone or in combination with other processors to perform operations comprising:
   accessing first training data for a language model for fine-tuning a pretrained language model (PLM) to analyze textual inputs, determine readability scores for the textual inputs, and output readability scores, the PLM having been pretrained on a corpus of second training data to analyze textual inputs and having not been pretrained to determine the readability scores for the textual inputs;
   fine-tuning training of the PLM using the first training data to enable the PLM to receive a textual input, generate a readability score for the textual input, and output the readability score for the textual input;

obtaining first aggregated readability scores generated by analyzing an output of a first version of a language model using the PLM and aggregating first readability scores output by the PLM;

obtaining second aggregated readability scores generated by analyzing the output of a second version of the language model using the PLM and aggregating second readability scores output by the PLM; and selectively utilizing the first version of the language model or the second version of the language model to analyze textual content based on the first aggregated readability scores and the second aggregated readability scores.

2. The data processing system of claim 1, wherein the machine-readable storage medium includes instructions configured to cause the processor alone or in combination with other processors to perform operations of:

accessing second training data that includes training data for training the PLM to recognize domain-specific terminology when determining the readability score of the textual input; and fine-tuning training of the PLM using second training data.

3. The data processing system of claim 1, wherein the machine-readable storage medium includes instructions configured to cause the processor alone or in combination with other processors to perform operations of:

receiving, from a first application on a first client device via a first network connection, a request to provide a first readability score for a first textual content from the first application;

analyzing the first textual content with the PLM to obtain a first readability score for the first textual content;

performing one or more actions on the first textual content based on the first readability score for the first textual content; and prior to analyzing the first textual content to the PLM, segmenting the first textual content into a plurality of first segments using a second language model trained to recognize one or more segment boundaries in the first textual content and to output a plurality of first segments of textual content.

4. The data processing system of claim 3, wherein analyzing the first textual content with the PLM to obtain the first readability score for the first textual content further comprises:

analyzing each segment of the plurality of first segments of the first textual content with the PLM to obtain a plurality of segment readability scores, wherein each readability score of the plurality of segment readability scores is associated with a segment of the plurality of first segments; and aggregating the plurality of segment readability scores to determine the first readability score for the first textual content.

5. The data processing system of claim 4, wherein aggregating the plurality of segment readability scores further comprises:

determining the first readability score based on an average of the plurality of segment readability scores for the plurality of first segments.

6. The data processing system of claim 1, wherein to obtain the first aggregated readability scores generated by analyzing the output of the first version of a language model using the PLM and aggregating the first readability scores output by the PLM, the machine-readable storage medium includes instructions configured to cause the processor alone or in combination with other processors to perform operations of:

providing a set of reference input data to the first version of the language model to obtain a set of first reference textual content output by the first version of the language model;

analyzing the set of first reference textual content output by the first version of the language model using the PLM to obtain a set of first reference readability scores for the set of reference input data; and aggregating the set of first reference readability scores for the set of reference input data to generate the first aggregated readability scores for the first version of the language model.

7. The data processing system of claim 6, wherein to obtain the second aggregated readability scores generated by analyzing the output of the second version of the language model using the PLM and aggregating the second readability scores output by the PLM, the machine-readable storage medium includes instructions configured to cause the processor alone or in combination with other processors to perform operations of:

providing the set of reference input data to the second version of the language model to obtain a set of second reference textual content output by the second version of the language model;

analyzing the set of second reference textual content output by the second version of the language model using the PLM to obtain a set of second reference readability scores for the set of reference input data; and aggregating the set of second reference readability scores for the set of reference input data to generate a second aggregated readability score for the second version of the language model.

8. The data processing system of claim 7, wherein the machine-readable storage medium includes instructions configured to cause the processor alone or in combination with other processors to perform operations of:

comparing the first aggregated readability scores with the second aggregated readability score; and updating the first version of the language model with the second version of the language model responsive to the second aggregated readability score exceeding the first aggregated readability scores.

9. The data processing system of claim 1, wherein the machine-readable storage medium includes instructions configured to cause the processor alone or in combination with other processors to perform operations of:

receiving, from a first application on a first client device via a first network connection, a request to provide a first readability score for a first textual content from the first application;

analyzing the first textual content with the PLM to obtain a first readability score for the first textual content;

performing one or more actions on the first textual content based on the first readability score for the first textual content; and causing the first application of the first client device to present the first readability score on a user interface of the first application.

10. The data processing system of claim 9, wherein the machine-readable storage medium includes instructions configured to cause the processor alone or in combination with other processors to perform operations of:

generating second textual content based on the first textual content using a readability language model trained to receive the first textual content as an input and to output the second textual content, the second textual content having a second readability score higher than the first readability score; and causing the first application of the first client device to present the second textual content on a user interface of the first application.

* * * * *